US008922977B2

(12) United States Patent
Faber

(10) Patent No.: US 8,922,977 B2
(45) Date of Patent: Dec. 30, 2014

(54) PASSIVE ARC MANAGEMENT SYSTEM WITH A FLUE CHAMBER

(75) Inventor: Timothy Robert Faber, Marion, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 196 days.

(21) Appl. No.: 13/452,145

(22) Filed: Apr. 20, 2012

(65) Prior Publication Data

US 2013/0279083 A1 Oct. 24, 2013

(51) Int. Cl.
*H02B 7/01* (2006.01)
*H05K 7/20* (2006.01)

(52) U.S. Cl.
USPC ........... 361/618; 361/605; 361/608; 361/643; 361/678; 361/690; 218/114; 218/157; 174/17 VA; 174/50

(58) Field of Classification Search
USPC ......... 361/600, 601, 602, 605, 608, 611, 614, 361/618, 622, 624, 627, 634, 636, 641, 652, 361/656, 673, 676; 218/34, 35, 149, 151, 218/155–158; 335/8–11, 85, 102, 120, 160, 335/132, 165–176, 201, 202; 200/50.1, 200/50.3, 50.17, 50.21, 50.23, 50.32, 200/306–308, 289, 400; 174/17 R, 17 VA, 174/50, 58, 68.1, 68.2, 520; 312/223.2; 454/184
See application file for complete search history.

(56) References Cited

U.S. PATENT DOCUMENTS

| 2,359,247 | A | * | 9/1944 | Rowe | 361/608 |
|---|---|---|---|---|---|
| 2,824,939 | A | * | 2/1958 | Claybourn et al. | 200/289 |
| 4,360,857 | A | * | 11/1982 | Olashaw | 361/648 |
| 4,374,405 | A | * | 2/1983 | Olashaw et al. | 361/639 |
| 4,876,424 | A | * | 10/1989 | Leone et al. | 200/306 |
| 5,193,049 | A | * | 3/1993 | Jackson | 361/676 |
| 5,574,624 | A | * | 11/1996 | Rennie et al. | 361/676 |
| 5,710,402 | A | * | 1/1998 | Karnbach et al. | 218/157 |
| 5,811,749 | A | * | 9/1998 | Bausch et al. | 218/157 |
| 6,100,778 | A | * | 8/2000 | Deylitz | 335/201 |
| 6,326,872 | B1 | * | 12/2001 | Marchand et al. | 335/202 |
| 6,388,867 | B1 | * | 5/2002 | Rakus et al. | 361/605 |

(Continued)

FOREIGN PATENT DOCUMENTS

| DE | 2813693 | 10/1979 |
|---|---|---|
| DE | 4107673 | 9/1992 |
| FR | 2170801 | 9/1973 |
| JP | 2004129464 | 4/2004 |

OTHER PUBLICATIONS

International Search Report for International App. No. PCT/US2013/036911—Date of Completion of Search: Jun. 25, 2013, 3 pages.

(Continued)

*Primary Examiner* — Michail V Datskovskiy
(74) *Attorney, Agent, or Firm* — Locke Lord LLP

(57) ABSTRACT

In an electrical distribution cabinet a mechanism providing quick, reliable, passive arc blast control has a flue chamber surrounding the likely arc site such as an electrical connection point. The flue chamber provides a flue channel which lengthens the arc and attenuates the current and temperature until the arc is extinguished. Preferably, the flue chamber and channel are formed of opposable open-faced polyhedral structures, one fitting inside the other. The mechanism is particularly suited for draw-out circuit breaker connections in a switch gear cabinet.

18 Claims, 3 Drawing Sheets

(56) References Cited

U.S. PATENT DOCUMENTS

| | | | |
|---|---|---|---|
| 6,407,331 B1 * | 6/2002 | Smith et al. | 174/50 |
| 6,417,443 B1 * | 7/2002 | Smith | 174/17 VA |
| 6,512,192 B1 * | 1/2003 | Yee et al. | 218/157 |
| 6,670,872 B2 * | 12/2003 | Kurzmann | 335/201 |
| 6,765,169 B2 * | 7/2004 | Kruschke | 218/155 |
| 6,827,643 B2 * | 12/2004 | Eiselt et al. | 454/184 |
| 6,977,354 B1 * | 12/2005 | Shea et al. | 218/157 |
| 7,140,702 B2 * | 11/2006 | Byron et al. | 312/296 |
| 7,236,352 B2 * | 6/2007 | Dalis | 361/608 |
| 7,586,738 B1 * | 9/2009 | Hartzel et al. | 361/676 |
| 7,598,833 B1 * | 10/2009 | Hodges et al. | 335/201 |
| 7,646,271 B2 * | 1/2010 | Gottschalk et al. | 335/202 |
| 7,821,774 B2 * | 10/2010 | Josten et al. | 361/605 |
| 7,952,857 B1 * | 5/2011 | Motley et al. | 361/678 |
| 7,974,078 B2 * | 7/2011 | Coomer et al. | 361/678 |
| 8,101,881 B2 * | 1/2012 | Miller et al. | 218/157 |
| 8,242,395 B2 * | 8/2012 | Josten et al. | 200/306 |
| 8,525,061 B2 * | 9/2013 | Shea et al. | 218/114 |
| 8,598,484 B2 * | 12/2013 | Engel et al. | 218/157 |
| 8,648,274 B2 * | 2/2014 | Carlson et al. | 218/157 |
| 8,733,855 B2 * | 5/2014 | Josten et al. | 312/223.1 |
| 8,748,771 B2 * | 6/2014 | Franco | 218/157 |
| 2006/0067018 A1 * | 3/2006 | Malkowski et al. | 361/2 |
| 2006/0148288 A1 * | 7/2006 | Azzola et al. | 439/138 |
| 2009/0185332 A1 * | 7/2009 | Coomer et al. | 361/605 |
| 2009/0212022 A1 * | 8/2009 | Josten et al. | 218/157 |
| 2012/0028559 A1 * | 2/2012 | Kingston | 454/184 |
| 2012/0097413 A1 * | 4/2012 | Bugaris et al. | 174/50 |

OTHER PUBLICATIONS

Written Opinion of the International Searching Authority for International App. No. PCT/US2013/036911—Date of Completion of Opinion: Jun. 25, 2013, 6 pages.

English Language Machine Translation of German Patent Application Publication No. DE2813693—3 pages.

English Language Machine Translation of German Patent Application Publication No. DE4107673—5 pages.

English Language Machine Translation of Japanese Patent Application Publication No. JP2004129464—28 pages.

English Language Machine Translation of French Patent Application Publication No. FR2170801—4 pages.

\* cited by examiner

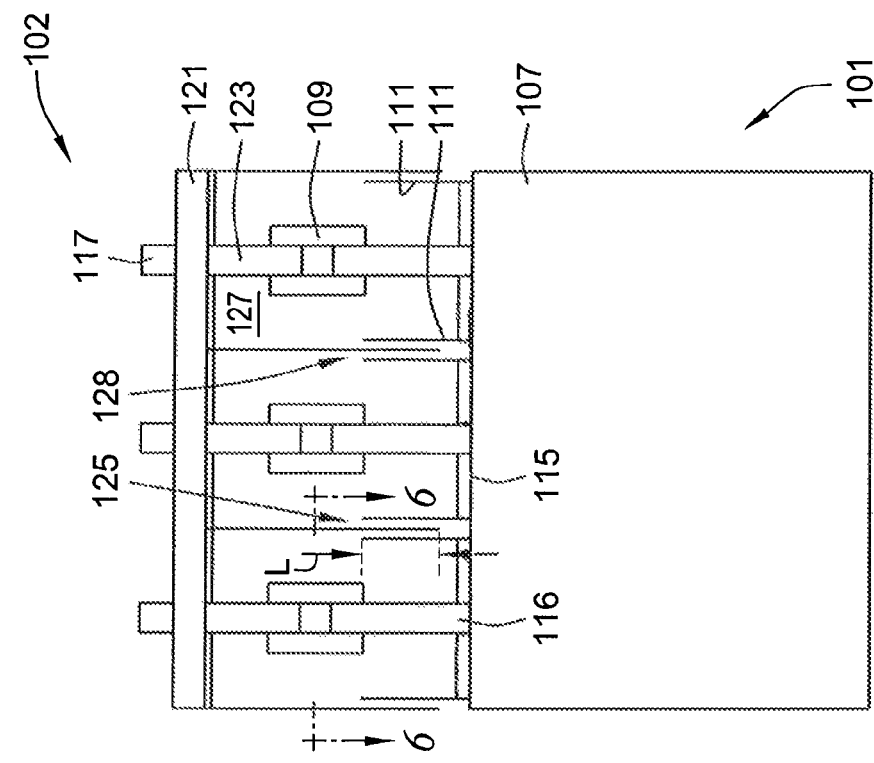
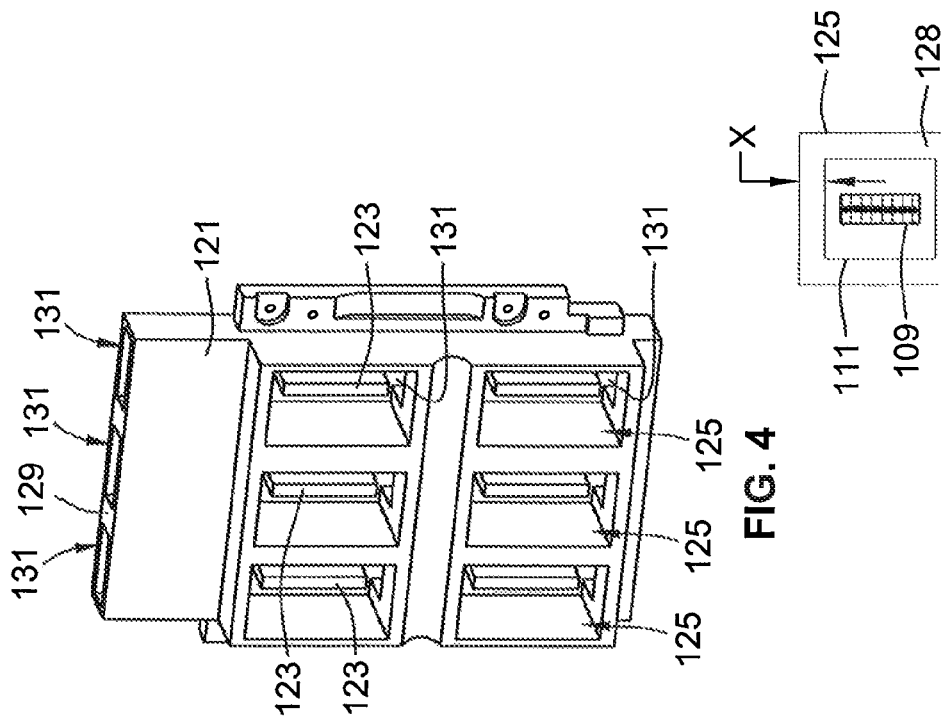

PASSIVE ARC MANAGEMENT SYSTEM WITH A FLUE CHAMBER

BACKGROUND OF THE INVENTION

1. Field of the Invention

The present invention relates generally to electrical distribution equipment and conductors contained within enclosures referred to herein generally as cabinets, although such enclosures need not have doors to benefit from the present invention. The invention relates more particularly to passively controlling the effects of arc faults in electrical cabinets. Arc control referred to herein is not within the circuit breakers themselves, i.e. not bolted faults.

2. Discussion of the Known Art

The hazards of unexpected and/or uncontrolled arcing events, also called arc faults, in an electrical cabinet are well known and include potential damage to equipment and harm to personnel in the operating environment caused by arc flash and arc blast, hereinafter referred to for simplicity as arc blast. Both passive and active arc control means are known in the art. Passive means include directed venting of the arc blast energy and gasses out of the cabinet. Other passive means may include reinforcement of the cabinet structure in an effort to withstand the blast. Neither form of passive method limits fault duration or is easily retrofitable into existing switchgear cabinets. Active means usually include some form of sensing and a switching mechanism to control the current. Concerns with active means may include expense, nuisance trips, speed, and undetected system failures. Of course, the quicker the arc is controlled the less harm is likely to be done by the arcing event.

SUMMARY OF THE INVENTION

A quick, economical, passive mechanism for controlling and extinguishing arc events inside electrical cabinets would be welcome in the art. To that end, the present invention in its various aspects and embodiments teaches and provides an arc management system having a flue chamber surrounding the likely arc site within a cabinet, such as electrical connection or proximity points between or among conductors and equipment. The flue chamber provides a flue channel which lengthens the arc and attenuates the current and temperature until preferably the arc is extinguished. Preferably, the flue chamber and channel are formed of opposable open faced parallelepiped or other polyhedral structures, i.e. boxes with the lids off, one fitting inside the other with a gap therebetween, thus creating a ring-shaped channel between the outer diameter (OD) or wall of the inner box and the inner diameter (ID) or wall of the outer box. Since the parallelepiped structures can be considered as basically tubular, terminology common to curved surfaces may be used herein as an aid to explanation.

Thus several advantages may be provided the arc management system including arc prevention by physical barriers for isolation from the cause of inadvertent arcing, such as dropped tools or other shorting conductors or environmental contamination such as moisture, and arc extinguishing or attenuation by the flue chamber which is sized, located and arranged so as to draw out the arc thereby lessening its current and heat.

In some aspects the invention may provide an arc management system with a passive arc attenuator for electrical equipment having a possibility of significant arc fault damage such as from shorting between exposed electrical conductors. Typically such conductors would be contained in an enclosure, also called herein a cabinet, separating the electrical equipment from the outside, or ambient, environment. By surrounding the likely arcing site, i.e. the electrical conductors, with a flue chamber providing a flue channel formed therein, the flue chamber can contain and the flue channel can draw out, i.e. attenuate an arc therein.

In some aspects of the invention the flue channel will be formed by the ring-shaped space between a pair of concentric box-like, or polyhedral, chambers with at least one chamber moveable to nest within the other. However, the invention is not so limited and may be accomplished by a variety of shapes or formations whether integral or multipart, and fixed or movable, providing the flue channel around the arc site. It is one primary concern that the flue channel is a channel of narrow cross section and sufficient length to attenuate or extinguish the arc.

Some aspects of the invention may be particularly suited or adaptable for arc management around a draw out circuit breaker contained within a drawer in the breaker section of a switch gear cabinet. Arcing may be a concern for such circuit breaker arrangements which often include conductive clusters on the breaker for joining with conductor extensions of an adjacent bus section. One part of flue chamber portion may be provided by placing cluster shields of appropriate shape and size on the back of the breaker surrounding the clusters. A second part of the flue chamber portion may be provided by placing phase-surrounds about the conductors extensions on the back-mold of the breaker section in mating relation to the cluster shields. Thus the flue chamber will be formed when the breaker is placed in proximity to the conductors.

BRIEF DESCRIPTION OF THE DRAWINGS

The foregoing and other advantages of the present disclosure will become apparent upon reading the following detailed description and upon reference to the drawings of which:

FIG. 4 is a detail of the back-mold at the rear the circuit breaker section showing the phase barriers around the conductor extensions and the provision of convection cooling for the breaker.

FIG. 5 is a schematic top cutaway view of a formed flue chamber.

FIG. 6 is a schematic cross sectional view of the formed flue chamber along line 6-6 of FIG. 5.

DETAILED DESCRIPTION OF THE PREFERED EMBODIMENTS

Figure 1:
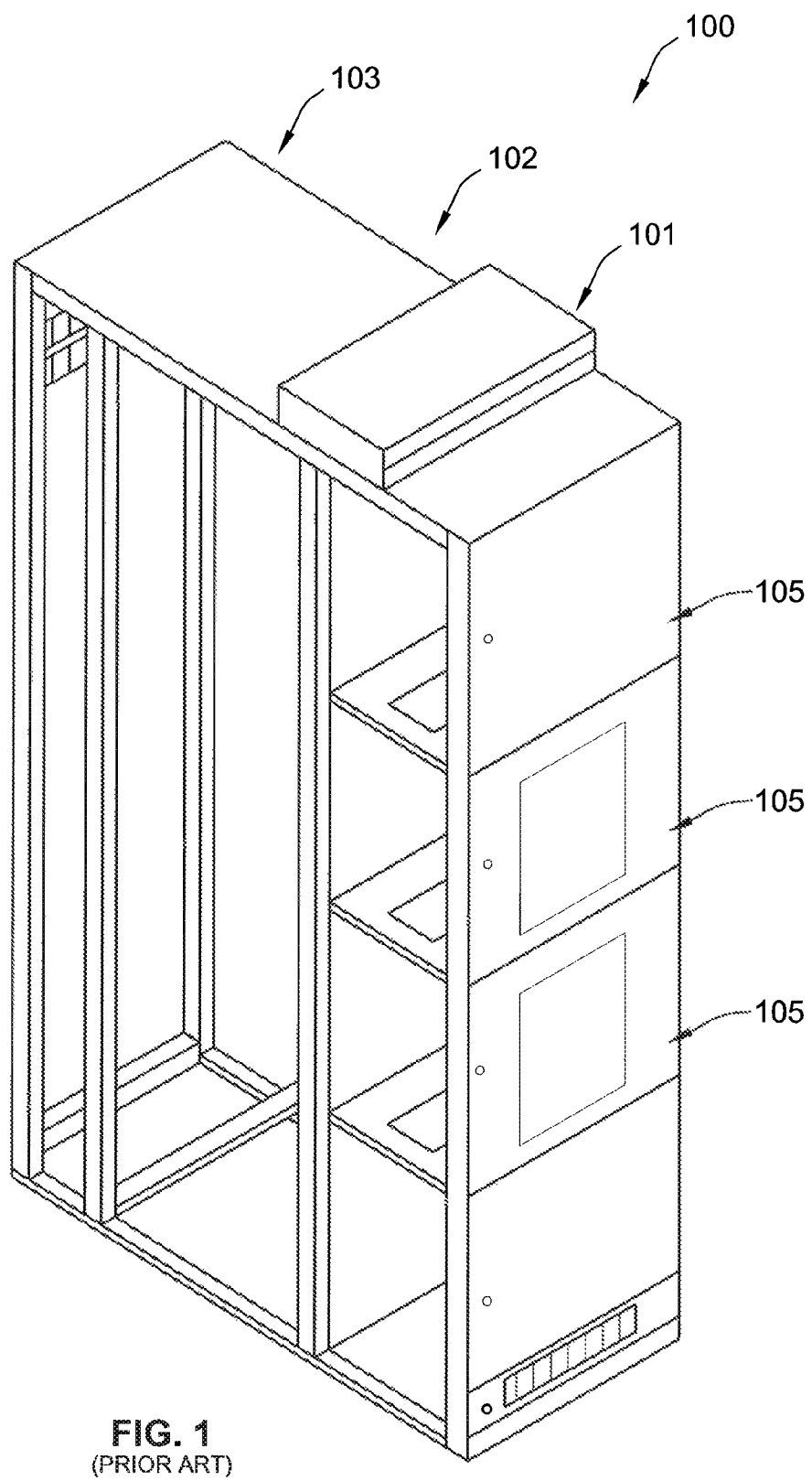
FIG. 1 is an exemplary embodiment of one suitable environment for the invention being a switchgear cabinet with a circuit breaker section and a bus section.

Referring to FIG. 1 a switch gear cabinet 100 generally known in the art is shown having a breaker section 101 for containing circuit breakers or other electrical equipment, a bus section 102 for distributing power to the various electrical equipment, and a cable section 103 for accepting and distributing line power. The switch gear cabinet 100 or a section thereof may serve as a cabinet protecting various parts of the electrical equipment or conductors from the outside environment as known in the art. As used herein, a cabinet may also be a protective cabinet within another larger cabinet in some instances. Several breaker compartments, collectively 105, are stacked vertically in the breaker section 101 so that each draw out breaker 107 (FIG. 2) will have a structure for receiving its draw out chassis for moving the breaker in and out of contact with the electrical supply feeding from the other two sections 102, 103, as further explained below.

Figure 2:
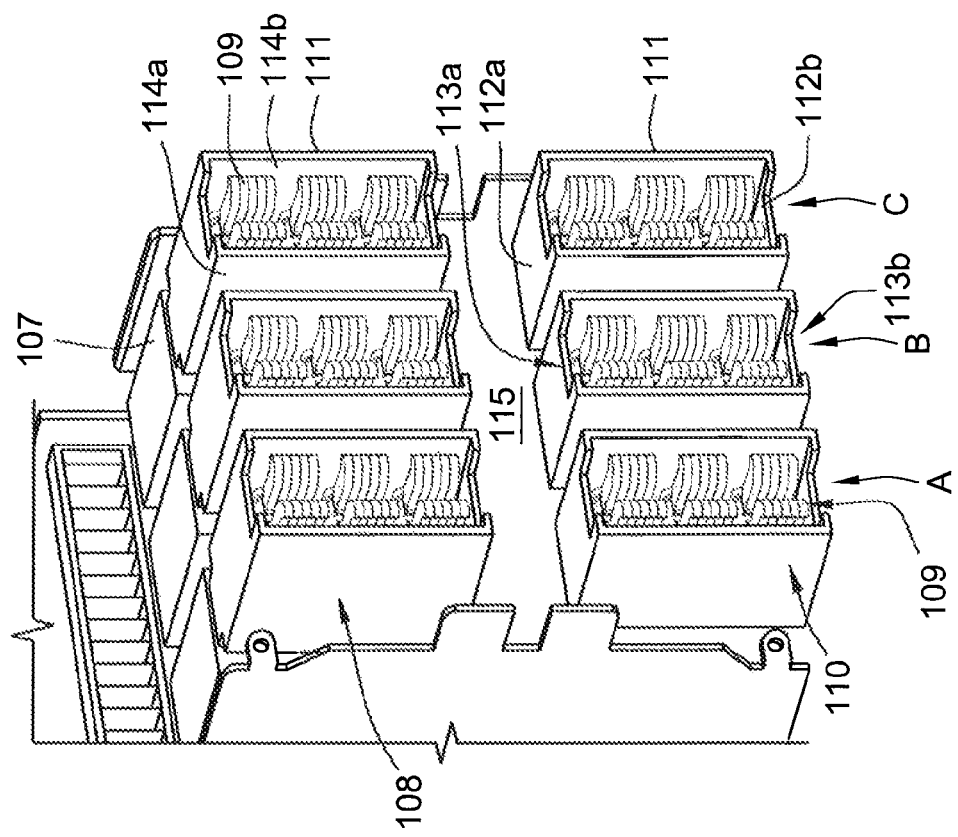
FIG. 2 is a perspective view detail of the rear of a draw out circuit breaker for the circuit breaker section of the switchgear cabinet of FIG. 1 showing the electrical connection clusters of the draw out circuit breaker and the cluster surrounds.

As seen in FIG. 2, a rear view of an exemplary draw out breaker 107, such as a SQUARE D MASTERPACT circuit breaker from Schneider Electric USA, Inc. of Palatine, Ill., shows the clusters 109 which are the connecting apparatus fitted to the breaker for attaching it to phases of the electrical power carried from the bus section 102, here shown as three phases A, B, C. Referring also to FIG. 5, it will be appreciated by the person having ordinary skill in the art that the clusters 109 might in some cases be fixed to the bus extensions 117 at the back mold 121 of the breaker section 101 instead of to the cluster supports 116 of the movable draw out breaker 107. The phases are separated in columns, with line and load connections of the breaker 107 being arranged in separate rows 108, 110. Around each set of clusters 109 is mounted a set of cluster shields 111. Each cluster shield 111 is essentially a parallelepiped with four sides or faces forming a box around the clusters. In the illustrated embodiment there are two horizontal sides, 112a, 112b, and two vertical sides 114a, 114b. The horizontal sides 112a, 112b, each have a notch 113a, 113b at the open end of the shield 111 to allow for passive heat convection as further explained below. The fifth side of the shield is formed by the rear wall 115 of the breaker. The sixth face is open to permit the clusters 109 to attach to the conductor extensions 123 which are the terminals of bus or conductor extensions 117 of the bus section 102, as seen schematically in the cross section of FIG. 5 and further discussed below.

Figure 3:
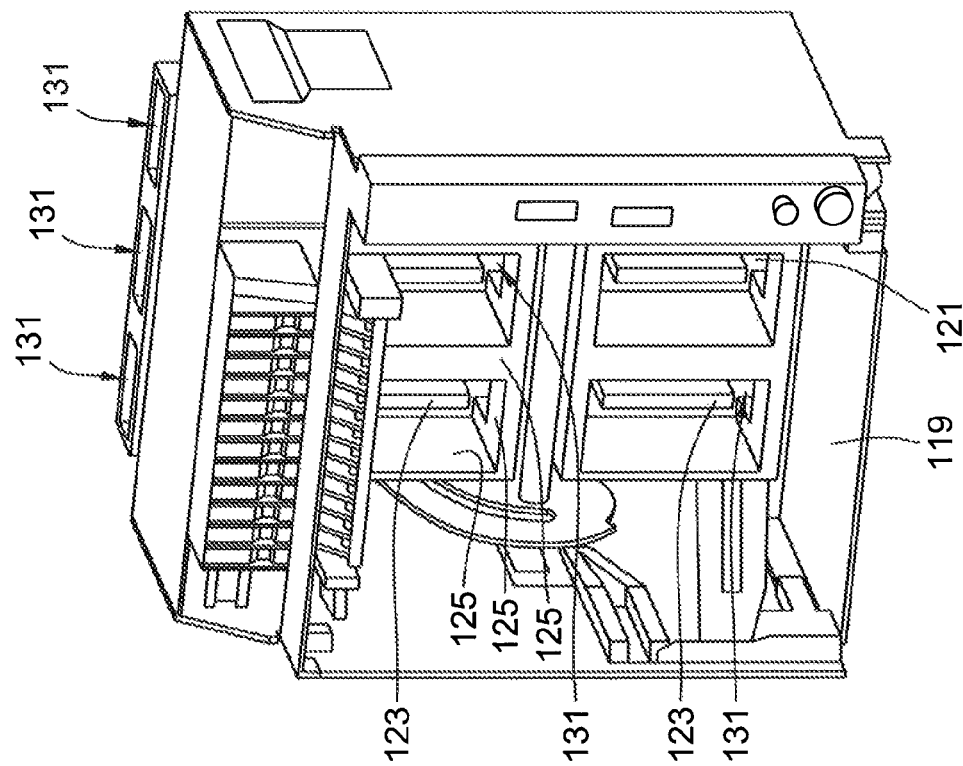
FIG. 3 is a perspective view detail of the back-mold, seen at the rear of the draw out circuit breaker carriage and cabinet, which provides the conductor extensions for mating with the electrical connection clusters of the draw out circuit breaker.

Referring also to FIGS. 3 and 4, FIG. 3 shows the circuit breaker draw out chassis 119 without the breaker 107 inserted. At the rear of the chassis 119 is the back-mold 121 of the breaker section 101 which provides the conductor extensions, collectively 123, for mating with the electrical connection clusters 109 of the draw out circuit breaker 107. The conductor extensions 123 extend through the back-mold 121 to connect to busses (not shown) within the bus section 102 of the switch gear cabinet 100 as understood in the art. Around each conductor extension 123 is a phase surround 125 comprising a parallelepiped structure of slightly larger inside dimension, for example 1.0 mm, than the external dimensions of the parallelepiped of the cluster shield 111, at the back of the breaker 107. Thus there is allowed a free space, hereinafter called a flue chamber 127 as seen in the cross section of FIG. 5 when the cluster shields 111 are inserted within the phase surrounds 125 as the breaker 107 is placed proximate the back-mold 121 forming a flue channel 128, whether in a "draw in" or "draw out" operation of the chassis 119, i.e. connecting or disconnecting the clusters 109 of the breaker 107 to the conductor extensions 123. It will be appreciated that together, the two parallelepiped structures, phase surrounds 125 and cluster shields 111, form both a physical barrier and the flue chamber 127 around the electrical connections of the breaker 107 as also illustrated schematically in the cross section of FIG. 6, along line 6-6 of FIG. 5. It will be appreciated that the schematic FIGS. 5 and 6 are obviously not to scale.

FIG. 4 is a detail of the back-mold 121 at the rear of the circuit breaker section 101 showing the phase surrounds 125 around each of the conductor extensions 123 and the provision of convection cooling for the breaker section 101. The phase surrounds 125 may be constructed of nonconductive thermoset polyester, plastic, or other suitable materials. In certain aspects of the invention the back-mold 121 is provided with a chimney 129 at the rear thereof to provide for convection shafts 131, preferably on each phase, through the phase surrounds 125 to remove heat from the back mold 121 and out of the breaker section 101 at the top, or back, or both, of the chimney 129 for thermal management of the stacked breakers. As heat builds at the electrical connection points of the clusters 109 to the conductor extensions 123, convection will draw the heated air away from the breakers. In some aspects of the invention it is contemplated that the phase surrounds and cluster shields may either or both be a single vertically oriented box commonly surrounding the line and load clusters of each phase rather than having a horizontal stop wall between the line and load clusters as shown in FIGS. 3 and 4. It is further desirable that an arrangement of the present system have any grounded metal covered or removed from the cluster-to-conductor extension areas.

Referring again to FIG. 5, during an arc fault, resultant plasma and gas will be forced through the narrow flue chamber 127 squeezing and lengthening the arc, thereby increasing arc voltage, lowering arc current, cooling the plasma and gases, and providing interruption of the arc. The cooling not only interferes with sustaining the arc, it reduces the chances of personal injury to those around the equipment. Depending on the desired result, the arc may be self extinguishing or interrupted in the breaker compartment and leaked/channeled to the bus compartment for restrike where it less likely to damage sensitive equipment. It will be appreciated by the person having ordinary skill in the art that a draw out breaker, having connect, disconnect, and test positions placing the clusters 109 at varying distances from the conductor extensions 123, must have an overlap of the phase surrounds 125 in each position, for the overlap to form a functional flue chamber 127 in all instances. At typical arc test parameters, e.g. in IEEE Standard C37.20.2™-2007, of 635 volts and 100 Kamps for 500 msec, a minimum overlap of 20.0 millimeters (mm) may suffice. In any event, a designer following the dictates of the present invention will seek to provide a large surface area and narrow cross sectional flue channel for the flue chamber. Arc length is desirably increased to where it may be self-extinguishing in less than one cycle. Overlap length, indicated as "L" in FIG. 5, and wall gap, also referred to as "cross section", indicated as "X" in FIG. 6, of the flue chamber is sized such that arc current is limited and extinguished at the first zero crossing (natural or forced) of the second phase to cross zero. It will be appreciated that in some aspects of the invention, the desired sizing of length L and cross section X may be interdependent such that the smaller the cross sectional dimension X is, the shorter the length dimension L can be.

Pressure, temperature, and arc duration within the breaker compartment, or other cabinet, will all be reduced due to the presence of the flue chamber surrounding the arc. Thus the present invention will remove stress on the electrical cabinet resulting in less need to reinforce it. It will be appreciated that the system of the present invention may be used with a variety of other active or passive arc management systems.

Having thus described a system of arc management for electrical cabinets; it will be appreciated that many variations thereon will occur to the artisan upon an understanding of the present invention, which is therefore to be limited only by the appended claims.

The invention claimed is:

1. An arc management system with a passive arc attenuator, comprising:
   a) electrical equipment having exposed electrical conductors;
   b) a cabinet separating the electrical equipment from an outside environment;
   c) a flue chamber within the cabinet and surrounding the electrical conductors,
   the flue chamber having a flue channel formed therein for the attenuation of an arc therein.

2. The arc management system of claim 1 wherein the flue channel is a ring shape.

3. The arc management system of claim 1 wherein
   the flue channel is a channel of narrow cross section and sufficient length to attenuate the arc.

4. The arc management system of claim 1 wherein
   the flue channel is a channel of narrow cross section and sufficient length to extinguish the arc.

5. An arc management system with a passive arc attenuator, comprising:
   a) electrical equipment having exposed electrical conductors;
   b) an cabinet separating the electrical equipment from an outside environment;
   c) a flue chamber within the cabinet and surrounding the electrical conductors,
   the flue chamber having:
   i) a first chamber portion open on one face, and
   ii) a second chamber portion open on one face and sized for covering the first chamber portion,
   d) the first chamber being movable to a position within the second chamber so as to form a flue channel therebetween for the attenuation of arc blast heat and current.

6. The arc management system with a passive arc attenuator of claim 5 wherein the first and second chamber portions are the same shape.

7. The arc management system with a passive arc attenuator of claim 5 wherein the second chamber has an ID of about one millimeter greater than the OD of the first chamber.

8. The arc management system with a passive arc attenuator of claim 5 wherein when the first chamber is placed within second chamber there is an overlap between them creating a flue channel length of at least about 20 millimeters.

9. The arc management system with a passive arc attenuator of claim 5 wherein the first chamber is movable in a straight line.

10. The arc management system with a passive arc attenuator of claim 5, wherein the flue chamber portions are parallepipeds having open faces.

11. The arc management system with a passive arc attenuator of claim 5, wherein the electrical equipment is a switchgear cabinet.

12. The arc management system with a passive arc attenuator of claim 11, wherein the switchgear cabinet has
    a breaker section, and
    a bus section.

13. The arc management system with a passive arc attenuator of claim 12, further including
    a draw out breaker in a drawer in the breaker section;
    the breaker including conductive clusters on the breaker for joining with conductor extensions of the bus section,
    cluster shields on the back of the breaker surrounding the clusters;
    a back-mold of the breaker section having cluster supports thereon leading to conductors of the bus section, and phase-surrounds on the back-mold.

14. The arc management system with a passive arc attenuator of claim 13, wherein the cluster shields and phase surrounds form the flue chamber.

15. The arc management system with a passive arc attenuator of claim 13, further including a chimney in the back-mold of the breaker section.

16. The arc management system with a passive arc attenuator of claim 15, further including shaping within the cluster shields or phase-surrounds or both to create openings for thermal management.

17. The arc management system with a passive arc attenuator of claim 12, wherein there are a plurality of breakers stacked vertically in the breaker section.

18. An arc management system with a passive arc attenuator, comprising:
    a) electrical equipment having exposed electrical conductors;
    b) a cabinet surrounding the electrical equipment, wherein said cabinet is within another larger cabinet;
    c) a flue chamber surrounding the exposed electrical conductors,
    the flue chamber having a flue channel formed therein for the attenuation of an arc from the electrical conductors.

* * * * *